United States Patent Office 3,139,333
Patented June 30, 1964

3,139,333
METHOD FOR REGULATING FRUIT SET
Robert I. Scott, Gasport, N.Y., assignor to FMC Corporation, New York, N.Y., a corporation of Delaware
No Drawing. Filed Mar. 5, 1962, Ser. No. 177,228
3 Claims. (Cl. 71—2.6)

This invention relates to methods for chemically treating deciduous fruit trees to thin the fruit without damage to the foliage, fruit or vigor of the trees.

The thinning of fruits is essential if good crops of desirable fruit are to be produced. In normal seasons, fruit trees produce considerably more fruit than the tree can mature safely. If left untreated, part of the fruit drops off due to natural causes, but too much fruit still remains resulting in the production of quantities of small fruit which are undesirable for marketing. Hence, the practice in all orchards is to thin the fruit in the early stages after setting. This requires a considerable amount of hand labor all of which must be done in a relatively short span of time. There has thus been a demand for some effective chemical treatment which would replace this hand labor.

Because of the possibility of poor pollination and the hazard of late spring frosts, most growers prefer to thin their trees after the fruit has set and a crop is assured rather than thinning in the blossom stage. The problem is to find a treatment that will effectively thin the fruit without malforming the fruit, leaving any toxic residues and without damaging the foliage or adversely affecting the vigor of the trees.

I have discovered that effective thinning of deciduous fruits such as applies and peaches can be obtained without damage to the fruit, the foliage or vigor of the trees and without the deposition of toxic residues, by spraying the tree in the period between the development of the blossoms and substantial development of the fruit, with an aqueous emulsion containing concentrations of the order of 100 to 600 p.p.m. of N-(3,4-dichlorophenyl)-methacrylamide, a material available commercially as a herbicide under the trade name Dicryl (Niagara Chemical Division, FMC Corporation).

The chemical may be prepared by the reaction of 3,4-dichloroaniline with methacrylyl chloride, or with phosphorus trichloride and methacrylic acid. These methods are exemplified in the following examples.

Example 1

METHACRYLYL CHLORIDE ROUTE

To a stirred solution of 17.8 g. (0.11 mole) of 3,4-dichloroaniline and 10.1 g. (0.1 mole) of triethylamine in 200 ml. of benzene was added dropwise 10.5 g. (0.01 mole) of freshly distilled methacrylyl chloride. The mixture was heated under reflux for one hour with stirring, then allowed to cool to room temperature. To the cooled mixture was added 100 ml. of 1% hydrochloric acid and stirring was continued for 0.5 hour. The benzene layer was separated and the aqueous phase was extracted twice with 50 ml. portions of ether. The combined benzene and ether solutions were washed with 100 ml. of water, separated and dried over anhydrous potassium carbonate. The solvent was removed by distillation to give 18.5 g. (76%) of solid product which melted at 123–125° C. Recrystallization from ligroinethanol gave a solid which melted at 124–126° C. Analysis.—Calcd. $C_{10}H_9Cl_2NO$: C, 52.20; H, 3.94. Found: C, 52.02; H, 3.67.

Example 2

METHACRYLIC ACID—PCl₃ ROUTE

A suspension of 4460 g. (27.5 moles) of 3,4-dichloroaniline in 8500 ml. of toluene was heated gently with stirring until all the aniline was dissolved. To the solution was slowly added over a period of 30 minutes, 755 g. (5.5 moles) of phosphorus trichloride, the temperature being allowed to rise to 85° C. The mixture was heated under reflux for 1.5 hours during which time solids separated which rendered stirring difficult. The mixture was allowed to cool slightly and to the solution was added slowly 1041 g. (12.1 moles) of glacial methacrylic acid. When addition of the acid was complete, the mixture was heated under reflux for an additional 2 hours. At the end of this time the orange slurry was filtered through a heated Buchner funnel. The filter cake of amine hydrochloride was returned to the reactor and triturated with 4000 ml. of boiling toluene and again filtered through a hot Buchner. The toluene filtrates were allowed to cool and the white solid which crystallized was isolated by filtration to give 1715 g. of product melting at 122–124° C.

Concentration of the mother liquor to $\frac{1}{10}$ volume yielded an additional 150 g. of product which melted at 122–124° C. Total yield was 71%.

The technical product is a white powder which is insoluble in water, less than 5% soluble in xylene but quite soluble in pyridine (33%), hexamethylphosphoramide (50%), isophorone (25–33%), acetone (20%), dimethylformamide (51%) and methyl iso butyl ketone (16.7%). The product is preferably marketed as an emulsifiable concentrate combining a good solvent for the chemical and a surfactant. Typical formulations include the following:

Example 3

| | 2 lbs./gal. |
|---|---|
| Dicryl | 23.40 |
| Dimethylformamide | 7.50 |
| Isophorone | 54.10 |
| Emcol H300X | 1.50 |
| Emcol H500X (blends of polyoxyethylene glycol ethers combined with calcium salt of oil-soluble sulfonate) | 13.50 |

Example 4

| | |
|---|---|
| Dicryl | 19.50 |
| Dimethylformamide | 6.18 |
| Isophorone | 43.53 |
| Xylene | 18.41 |
| Emcol H300X | 1.24 |
| Emcol H500X | 11.14 |

In using these emulsifiable concentrates, they are diluted in the orchard to the desired concentration of toxicant and applied as desired. These concentrates form good emulsions when mixed with water in any proportion.

The material may also be formulated as a wettable powder by combining the toxicant with any conventional powdery adjuvant and a dispersing agent. These wettable powders can also be made up into emulsions of the desired concentrations with water and can be used like the emulsifiable concentrates. Since they are somewhat more difficult to make into good emulsions, it is somewhat easier to work with the emulsifiable concentrate.

The following examples illustrate the use of the compound in the thinning of fruits. They are not of course limiting but merely illustrative of the invention.

Example 5

The emulsifiable concentrate of Example 3 was used and diluted to 300–500 p.p.m. with water. The materials were applied to limbs of separate trees and compared with an untreated check. The apples were of the Wealthy variety. The test was made in the blossom stage. The setting of the fruit was reduced as indicated in the following table:

TABLE I

| Material | Rate Applied, p.p.m. | Total Clusters | No. Fruit Set | Percent Fruit Set |
|---|---|---|---|---|
| Dicryl | 300 | 119 | 47 | 40 |
| Check | | 127 | 81 | 64 |
| Dicryl | 500 | 113 | 47 | 42 |
| Check | | 133 | 92 | 69 |

Slight wilting and yellowing of the foliage was noted, but there was no bad effect on the apples. When the apples matured, there was no residue.

*Example 6*

TEST ON APPLES

In this test the emulsifiable concentrate of Example 4 was used, diluted as indicated in the table. The emulsion was applied to Wealthy apple trees approximately ten days past full blossom. A Bean 300 gallon orchard sprayer was used. The trees were wet to run-off. Checks of foliage conditions were made 8, 14 and 21 days after spraying. Flower cluster counts were made a few days before spraying and fruit set was determined one month after spraying. The results are shown in the following tables:

TABLE II

| Plot | Material | Application Rate, p.p.m. | Foliage Condition | | |
|---|---|---|---|---|---|
| | | | After 8 days | After 2 wks. | After 3 wks. |
| 15 | Dicryl 1.6 EC | 800 | N, B, very slight injury to foliage | N, B, very slight foliage injury | N, B, C, very slight injury to mature foliage. |
| 16 | do | 600 | N, B, very slight foliage injury | do | N, B, very slight foliage injury. |
| 17 | do | 400 | N, Y, very slight scattered chlorosis | N, C, possible slight leaf curl | N, C, B, very slight foliage injury. |
| 18 | do | 200 | N, Y, very slight chlorosis possible | N, C, possible slight leaf curl | N, C, B, possible scattered very slight foliage injury. |
| 20 | Check (untreated) | | N, C, possible sight leaf curl | N | N. |

N = normal foliage.   Y = chlorosis.   B = marginal leaf burn.   C = leaf curl.

TABLE III

| Plot | Material | Application Rate, p.p.m. | Flower Clusters | Fruit Set | Fruit Set per 100 Clusters |
|---|---|---|---|---|---|
| 15 | Dicryl 1.6 EC | 800 | 219 | 52 | 23.7 |
| 16 | do | 600 | 265 | 21 | 7.9 |
| 17 | do | 400 | 248 | 49 | 19.8 |
| 18 | do | 200 | 352 | 137 | 38.9 |
| 20 | Check (untreated) | | 379 | 483 | 127.4 |

*Example 7*

Exactly the same group of tests as in Example 6, with the exception of rate of application, were run on Hale Haven peach trees. The following results were obtained:

TABLE IV

| Plot | Material | Appln. Rate, p.p.m. | Foliage Condition | | |
|---|---|---|---|---|---|
| | | | 8 days | 2 wks. | 3 wks. |
| 10 | Dicryl 1.6 EC | 300 | N | N | N |
| 11 | do | 200 | N | N, Y, possible slight scattered chlorosis. | N |
| 12 | do | 100 | N | N | N |
| 19 | Check (untreated) | | N | N | N |

N = normal foliage.   Y = chlorosis.

TABLE V

| Plot | Material | Appln. Rate, p.p.m. | Blossom Count | Fruit Set | Percent Fruit Set |
|---|---|---|---|---|---|
| 10 | Dicryl 1.6 EC | 300 | 388 | 55 | 14.2 |
| 11 | do | 200 | 545 | 125 | 22.8 |
| 12 | do | 100 | 468 | 197 | 42.1 |
| 19 | Check (untreated) | | 138 | 43 | 30.9 |

*Example 8*

In order to check the value of the method at the more desirable application time when the fruit is set, the material was applied to an orchard of Hale Haven peaches when the fruit had been set and was in the shuck-split stage, but when about ¾ of the fruit surface was exposed. The emulsifiable concentrate of Example 3 was used, application was as in Example 6. The trees were wet to run-off. Three random replicates of each treatment were made. The material was applied at rates ranging from 200 to 500 p.p.m. Pre-application fruit counts were made ten days before the test; post-application counts were made five weeks after the test. The orchard was wet by showers for about five hours shortly after the application with temperatures in the low 50's. It should be noted that the counts were not made on the complete trees but only on selected limbs which seem to be of normal health and vigor which were tagged when the counts were first made. About 1,500 to 2,000 fruit were counted initially in each test. The results were as follows:

TABLE VI

| Plot | Material | Appln. Rate, p.p.m. | 4 trees Pre-Appln. Fruit Count | 4 trees Total Fruit Set to Mature | Percent Fruit Set |
|---|---|---|---|---|---|
| 1 | Dicryl 1.6 EC | 500 | 1,644 | 96 | 5.8 |
| 2 | do | 400 | 1,382 | 96 | 6.9 |
| 3 | do | 300 | 2,058 | 233 | 11.3 |
| 4 | do | 200 | 1,644 | 164 | 10.0 |
| 5 | Check (untreated) | | 1,508 | 359 | 23.8 |

It will be noted that the fruit set was reduced about 50% by the application of either 200 or 300 p.p.m. of the regulating agent while further reductions were obtained at higher concentrations. The trees on which the fruit set had been reduced by 50% carried fruit of excellent size and quality. Full equivalent trees in the same plot were hand thinned by experienced operators. The plots were observed at weekly intervals for phytotoxic symptoms and no more than very slight effects were observed. The fruit was tested after picking for evidences of Dicryl and none was found.

The trees which were more heavily thinned had, at harvest, exceptionally large fruit. What was particularly noticeable about this fruit is that it was free of growth cracks which often occur when trees are hand thinned to as great an extent as was done with the Dicryl.

It will be observed from these tests that the growth regulant may be used over a wide range of concentrations, both to thin out the blossom clusters, and to thin the fruit after it has been set. Obviously the examples are illustrative of what can be done with the invention which is expressed in the following claims.

What is claimed is:

1. The method of thinning deciduous fruit which comprises spraying the trees at the stage from the time when the blossoms are formed to an early period after the setting of the fruit with an aqueous emulsion containing an effective amount and concentration to thin said deciduous fruit of N-(3,4-dichlorophenyl)methacrylamide.

2. The method of claim 1 in which the chemical is applied in an aqueous emulsion containing from 100 to 600 p.p.m. of methacrylamide.

3. The method of claim 1 in which the emulsion is applied to peaches at the shuck-split stage.

References Cited in the file of this patent

UNITED STATES PATENTS

| | | |
|---|---|---|
| 2,322,761 | Lontz | June 29, 1943 |
| 2,632,698 | Stewart | Mar. 24, 1953 |
| 2,776,196 | Gysin | Jan. 1, 1957 |

FOREIGN PATENTS

| | | |
|---|---|---|
| 1,116,469 | Germany | Nov. 2, 1961 |

OTHER REFERENCES

Fertig: "Proceedings of the Northeastern Weed Control Conference" vol. 15, Jan. 4, 5, 6, 1961, pages 23–28 (page 25 of special interest).